(12) United States Patent
Dimberg et al.

(10) Patent No.: US 12,300,448 B2
(45) Date of Patent: *May 13, 2025

(54) BASE FOR A RETROFIT REMOTE CONTROL DEVICE

(71) Applicant: Lutron Technology Company LLC, Coopersburg, PA (US)

(72) Inventors: Chris Dimberg, Easton, PA (US); Jason C. Killo, Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 207 days.

This patent is subject to a terminal disclaimer.

(21) Appl. No.: 18/087,282

(22) Filed: Dec. 22, 2022

(65) Prior Publication Data

US 2023/0127259 A1 Apr. 27, 2023

Related U.S. Application Data

(63) Continuation of application No. 17/376,896, filed on Jul. 15, 2021, now Pat. No. 11,569,051, which is a (Continued)

(51) Int. Cl.
*H01H 23/14* (2006.01)
*F21V 23/00* (2015.01)
(Continued)

(52) U.S. Cl.
CPC ......... *H01H 23/145* (2013.01); *F21V 23/009* (2013.01); *F21V 23/0435* (2013.01);
(Continued)

(58) Field of Classification Search
CPC ...... H01H 23/145; H01H 9/0271; H01H 9/54; H01H 23/04; H01H 23/205; H01H 23/24; (Continued)

(56) References Cited

U.S. PATENT DOCUMENTS 5,264,761 A    11/1993   Johnson et al.
5,753,983 A *   5/1998   Dickie ................... H05B 47/13
                                                     315/159

(Continued)

FOREIGN PATENT DOCUMENTS

CN         2596671 Y     12/2003
JP         S55109245 U     7/1980
(Continued)

*Primary Examiner* — Edwin A. Leon
(74) *Attorney, Agent, or Firm* — Flaster Greenberg P.C.

(57) ABSTRACT

A remote control device may control electrical loads and/or load control devices of a load control system without accessing electrical wiring. The remote control device may include a control unit and a base that may be configured to be mounted over a paddle actuator of an installed mechanical switch. The base may include a frame, a biasing member, and/or a ribbon portion. The frame may be configured to secure the remote control device thereto. The frame may define a rear surface that is configured to abut a bezel of the mechanical switch. The biasing member may be configured to engage a rear surface of a faceplate of the mechanical switch. The ribbon portion may be configured to attach the biasing member to the frame. The ribbon portion may be configured to extend through a gap between the bezel and the faceplate.

25 Claims, 12 Drawing Sheets

Related U.S. Application Data continuation of application No. 16/874,339, filed on May 14, 2020, now Pat. No. 11,107,651.

(60) Provisional application No. 62/847,480, filed on May 14, 2019.

(51) Int. Cl.

| | | |
|---|---|---|
| *F21V 23/04* | (2006.01) | |
| *G08C 17/02* | (2006.01) | |
| *H01H 9/02* | (2006.01) | |
| *H01H 9/54* | (2006.01) | |
| *H01H 23/04* | (2006.01) | |
| *H01H 23/20* | (2006.01) | |
| *H01H 23/24* | (2006.01) | |
| *H05B 47/19* | (2020.01) | |

(52) U.S. Cl.
CPC ............ *G08C 17/02* (2013.01); *H01H 9/0271* (2013.01); *H01H 9/54* (2013.01); *H01H 23/04* (2013.01); *H01H 23/205* (2013.01); *H01H 23/24* (2013.01); *H05B 47/19* (2020.01); *H01H 2300/03* (2013.01)

(58) Field of Classification Search
CPC .... H01H 2300/03; H01H 9/08; F21V 23/009; F21V 23/0435; H05B 47/19
See application file for complete search history.

(56) References Cited

U.S. PATENT DOCUMENTS

| | | | |
|---|---|---|---|
| 7,834,856 B2 | 11/2010 | Grinshpoon et al. | |
| 9,208,965 B2 | 12/2015 | Busby et al. | |
| 9,418,802 B2 | 8/2016 | Romano et al. | |
| 9,520,247 B1 | 12/2016 | Finnegan et al. | |
| 9,583,288 B2 | 2/2017 | Jones et al. | |
| 9,799,469 B2 | 10/2017 | Bailey et al. | |
| 9,959,997 B2 | 5/2018 | Bailey et al. | |
| 11,107,651 B2 * | 8/2021 | Dimberg | F21V 23/0435 |
| 11,569,051 B2 * | 1/2023 | Dimberg | H01H 9/08 |
| 11,817,856 B2 * | 11/2023 | Veskovic | H01H 23/145 |
| 2006/0258207 A1 | 11/2006 | Kidman | |
| 2008/0111491 A1 | 5/2008 | Spira et al. | |
| 2014/0117871 A1 | 5/2014 | Swatsky et al. | |
| 2015/0077021 A1 | 3/2015 | McCarthy et al. | |
| 2015/0357133 A1 | 12/2015 | Keirstead et al. | |
| 2015/0371534 A1 | 12/2015 | Dimberg et al. | |
| 2016/0049267 A1 | 2/2016 | Bailey et al. | |
| 2016/0073479 A1 | 3/2016 | Erchak et al. | |
| 2017/0105176 A1 | 4/2017 | Finnegan et al. | |
| 2017/0278652 A1 | 9/2017 | Dimberg et al. | |
| 2017/0280533 A1 | 9/2017 | Dimberg et al. | |
| 2017/0352506 A1 | 12/2017 | Dimberg | |
| 2018/0190451 A1 | 7/2018 | Scruggs | |
| 2019/0006129 A1 | 1/2019 | Dimberg et al. | |
| 2020/0037422 A1 | 1/2020 | Shivell | |
| 2020/0144007 A1 | 5/2020 | Shivell | |

FOREIGN PATENT DOCUMENTS

| | | |
|---|---|---|
| JP | 2002084616 A | 3/2002 |
| WO | 2011/139611 A2 | 11/2011 |

* cited by examiner

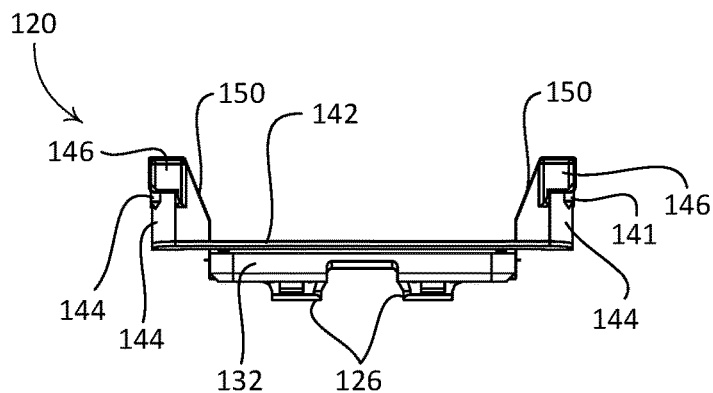
FIG. 9
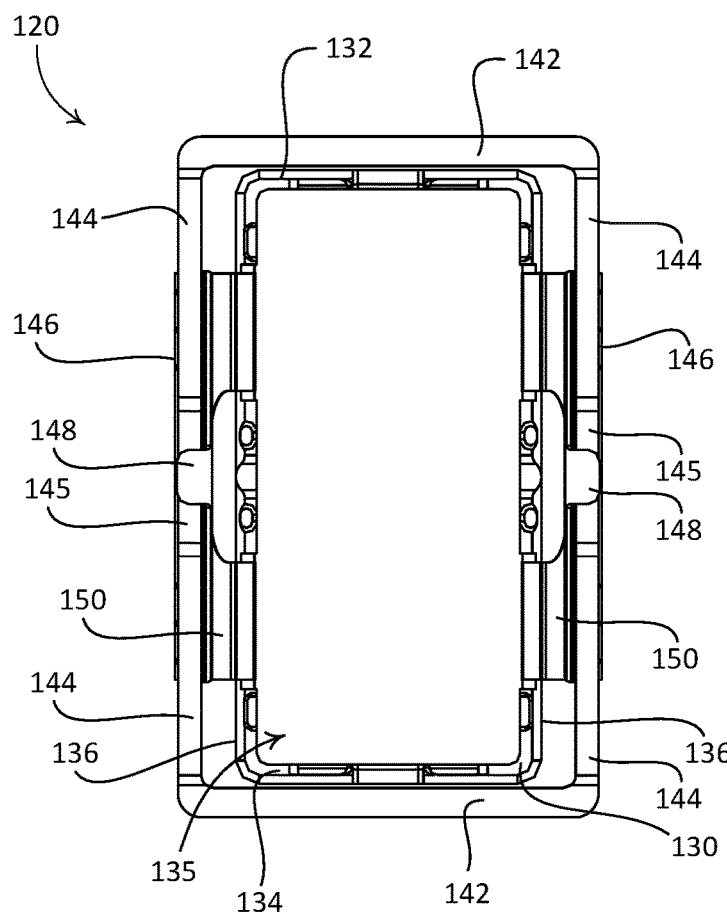 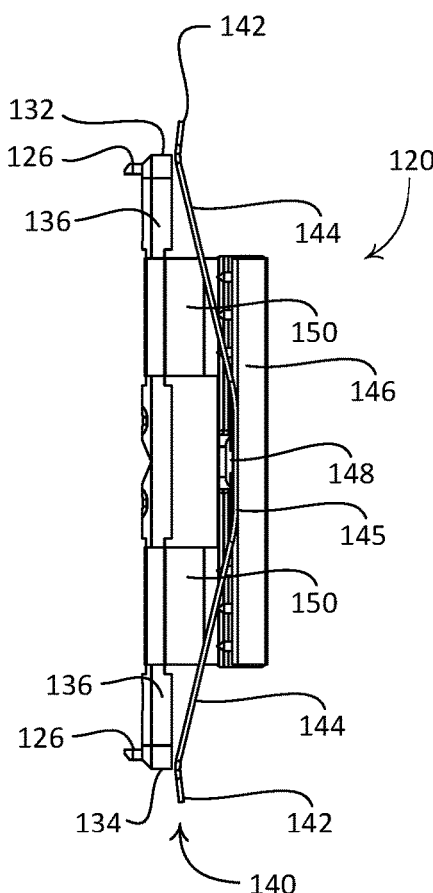
FIG. 7  FIG. 8

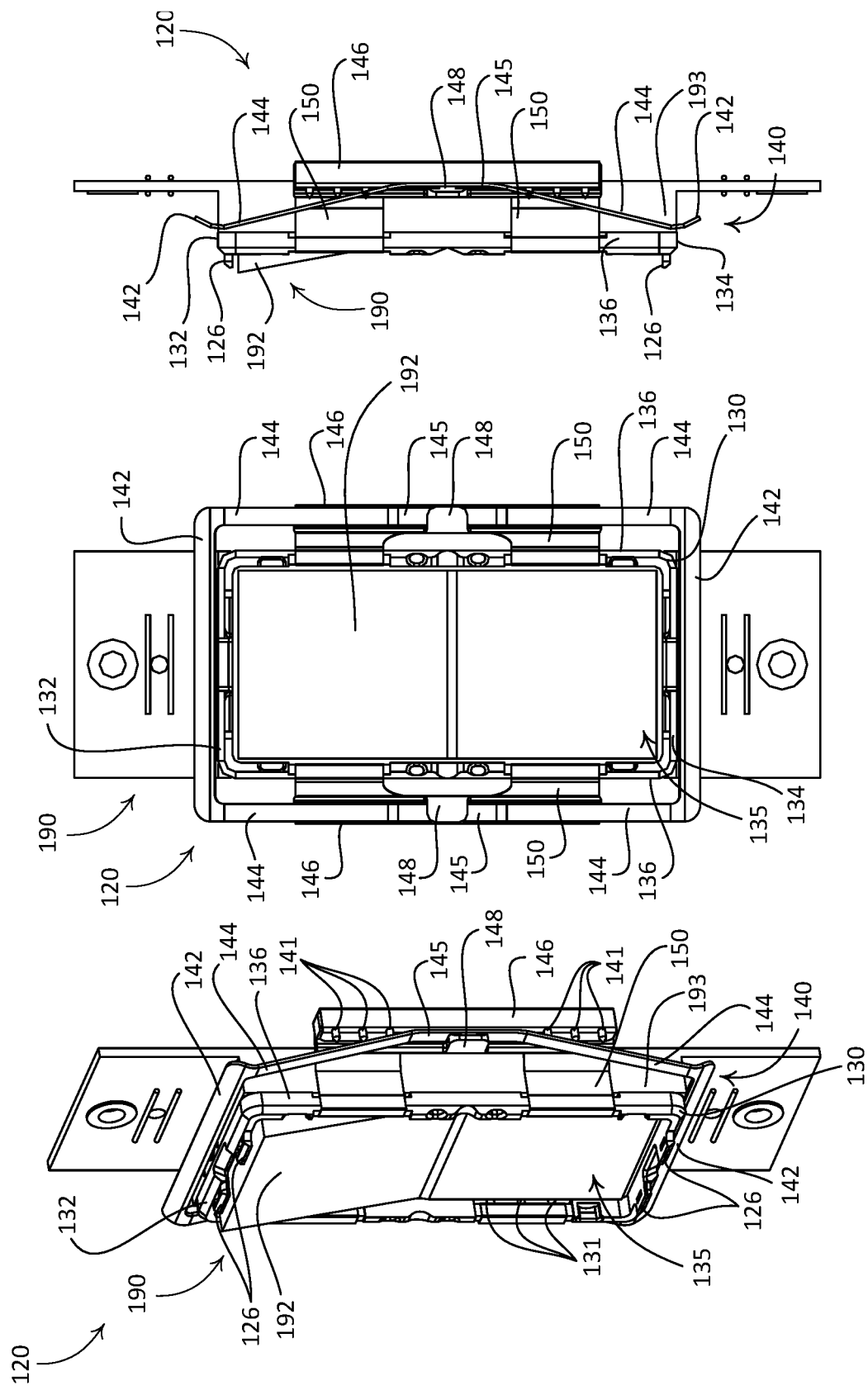

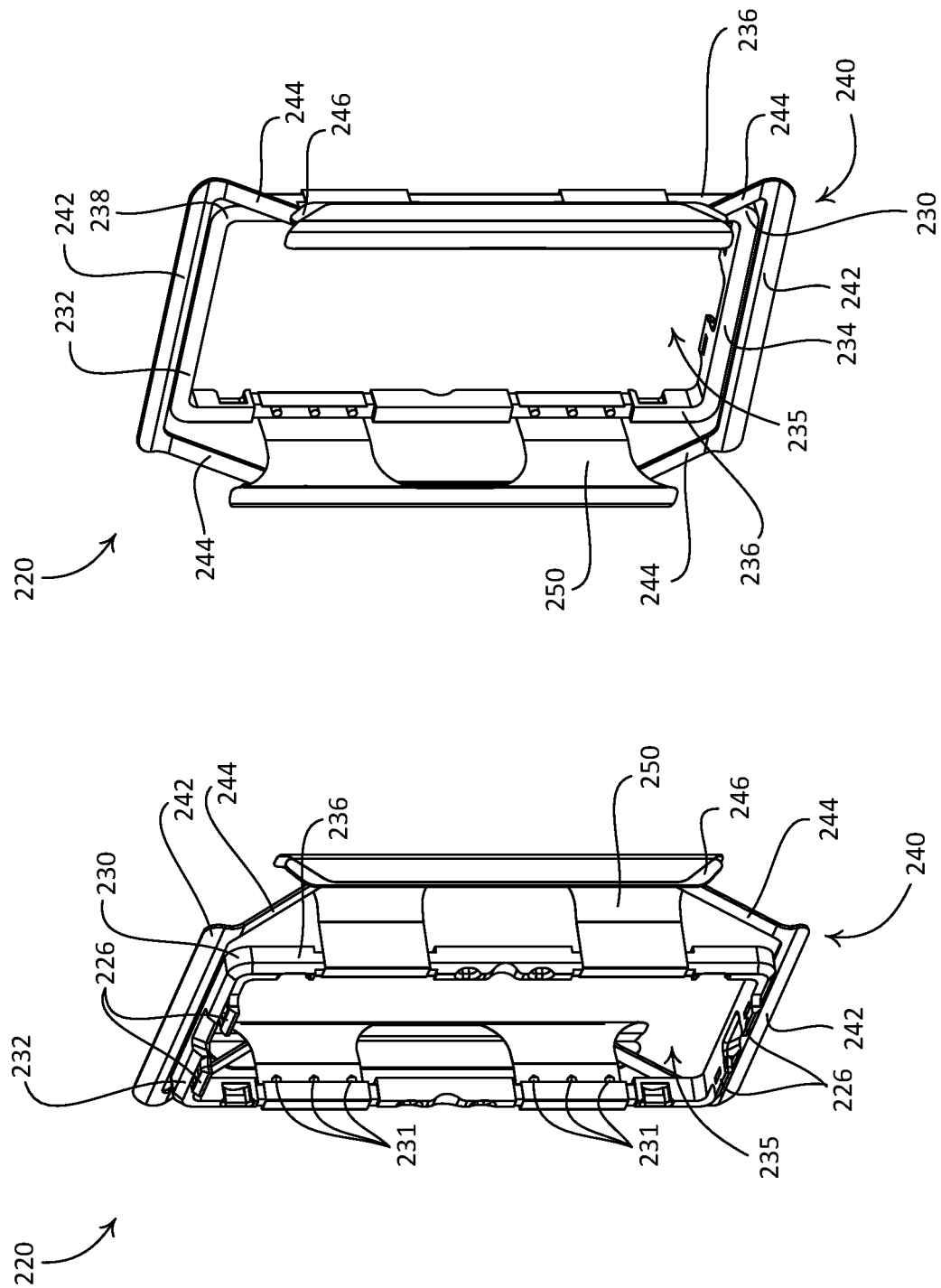

US 12,300,448 B2

BASE FOR A RETROFIT REMOTE CONTROL DEVICE

CROSS-REFERENCE TO RELATED APPLICATIONS

This application is a continuation of U.S. patent application Ser. No. 17/376,896, filed Jul. 15, 2021, which is a continuation of U.S. patent application Ser. No. 16/874,339, filed May 14, 2020, which claims the benefit of Provisional U.S. Patent Application No. 62/847,480, filed May 14, 2019, the disclosures of which are incorporated herein by reference in their entirety.

BACKGROUND

In load control systems, standard mechanical switches (e.g., decorator paddle switches, etc.) may be replaced with more advanced load control devices, such as dimmer switches, that control the amount of power delivered from an alternating-current (AC) power source to an electrical load. This procedure typically requires that the old decorator paddle switch be un-wired and removed from the load control system and the new load control device to be connected to the electrical wiring. Typically, such a procedure must be performed by an electrical contractor or other skilled installer. The average consumer may not feel comfortable to complete the installation of the load control device. Accordingly, there is a need for a load control system that may be installed in an existing installation having a decorator paddle switch without requiring any electrical work, and that is aesthetically pleasing.

SUMMARY

As described herein, a remote control device for use in a load control system, for example to control electrical loads and/or load control devices, may be configured to be mounted over an installed mechanical switch having a paddle actuator. The mechanical switch may control whether power is delivered to an electrical load. The remote control device may be installed without accessing electrical wiring of the mechanical switch.

The remote control device may include a base and a control unit that is configured to be removably attached to the base. The control unit may include a control interface and a wireless communication circuit. The control unit may cause the wireless communication circuit to transmit a control signal in response to a user input received via the control interface.

The base may be configured to be mounted over the paddle actuator of the mechanical switch. The base may include a frame, a coupling, a biasing member, and/or a ribbon portion. The frame may be configured to secure the remote control device thereto. The frame may define an opening that is configured to receive a protruding portion of the paddle actuator therein. The frame may define a rear surface that is configured to abut a bezel of the mechanical switch. The biasing member may be configured to engage a rear surface of a faceplate of the mechanical switch. The faceplate may be configured to be installed over a wallbox of the mechanical switch. The biasing member may be configured to apply a force on the rear surface of the faceplate. The ribbon portion may be configured to attach the biasing member to the frame. The ribbon portion may be configured to extend through a gap between the bezel and the faceplate such that the frame is located on a front side of the faceplate.

BRIEF DESCRIPTION OF THE DRAWINGS

FIG. 7 is a front view of the example base component illustrated in FIG. 3.

FIG. 8 is a side view of the example base component illustrated in FIG. 3.

FIG. 9 is a top view of the example base component illustrated in FIG. 3.

FIG. 10 is another perspective view of the example base component illustrated in FIG. 3 mounted to a paddle actuator of the light switch.

FIG. 11 is a front view of the example base component illustrated in FIG. 3 mounted to a paddle actuator of the light switch.

FIG. 12 is a side view of the example base component illustrated in FIG. 3 mounted to a paddle actuator of the light switch.

FIG. 15 is a front perspective view of another example base component of the example remote control device illustrated in FIG. 1.

FIG. 16 is a rear perspective view of the example base component illustrated in FIG. 15.

DETAILED DESCRIPTION

FIGS. 1-14 depict an example of a remote control device 100 that may be installed in a load control system, such as a lighting control system. The load control system may include a mechanical switch 190 that may be in place prior to installation of the remote control device 100, for example pre-existing in the load control system. As shown, the mechanical switch 190 may be a standard decorator paddle switch. The load control system may further include one or more electrical loads, such as lighting loads. The mechanical switch 190 may be coupled in series electrical connection between an alternating current (AC) power source and the one or more electrical loads.

Figure 4:
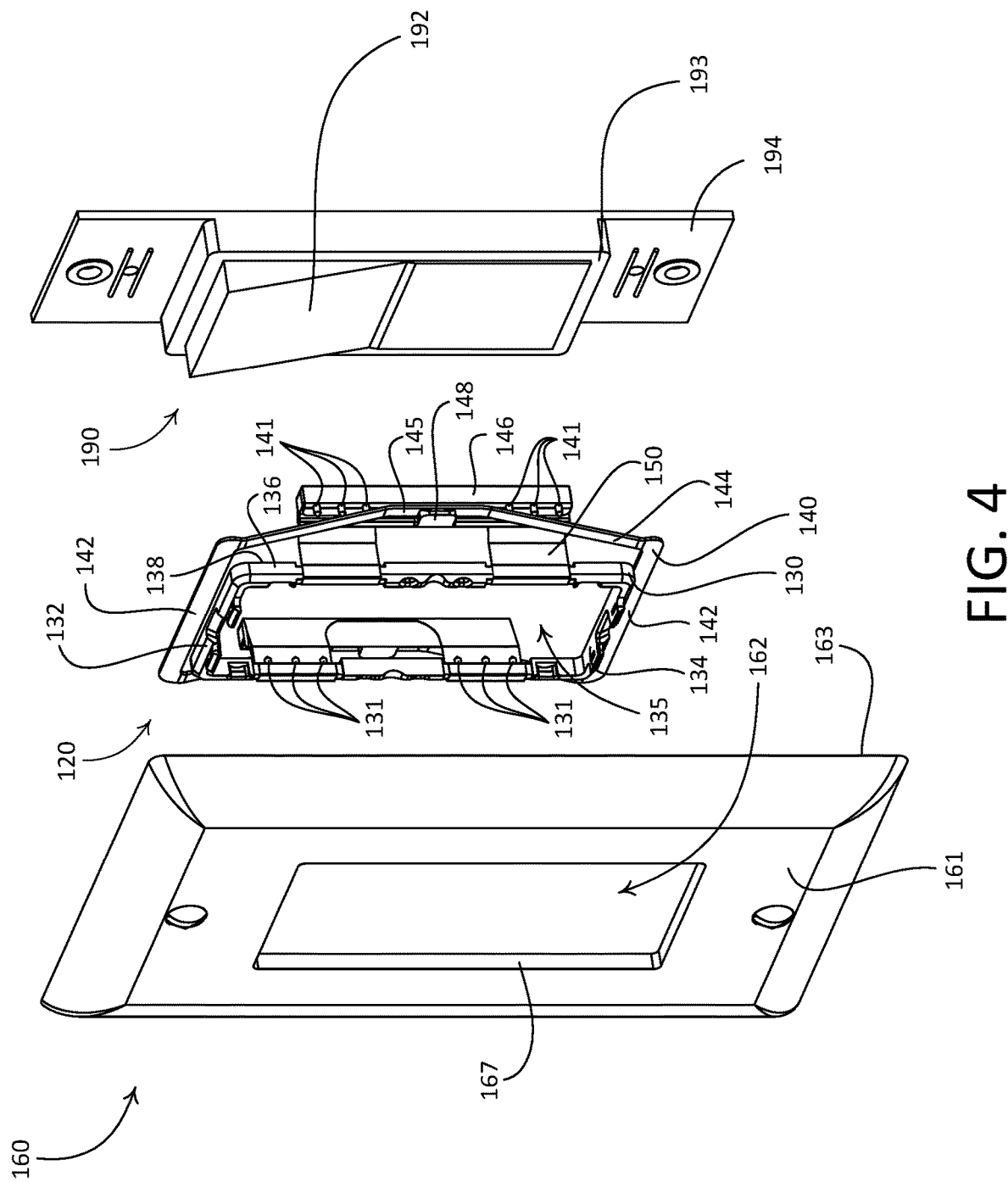
FIG. 4 is a partially exploded view of the example base component illustrated in FIG. 3 mounted to the paddle actuator of the light switch.
Figure 6:
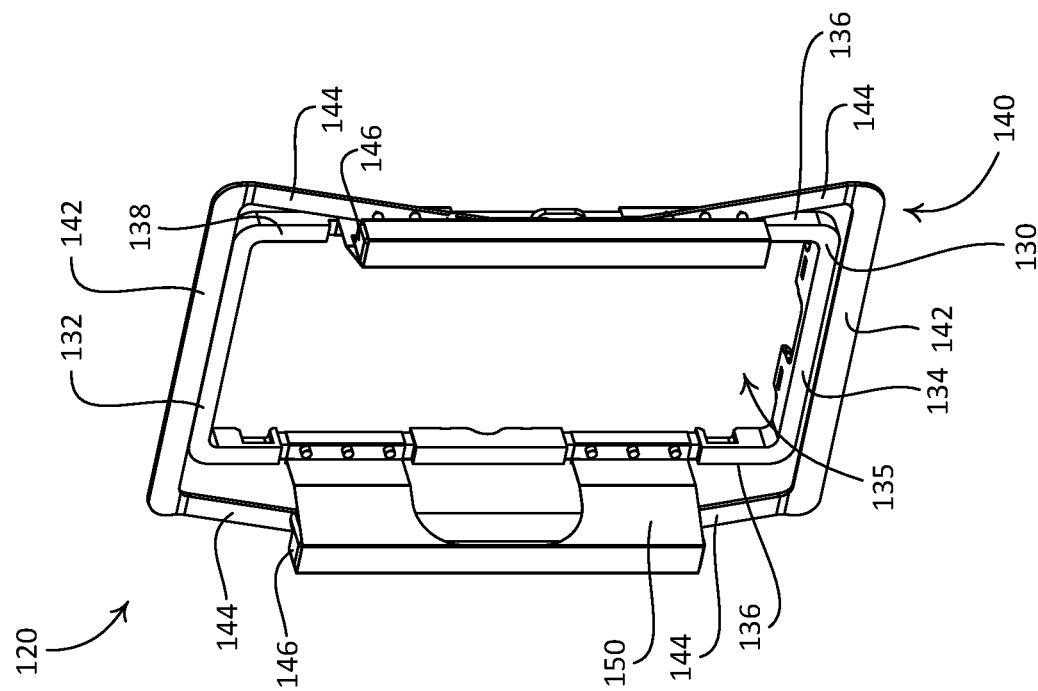
FIG. 6 is a rear perspective view of the example base component illustrated in FIG. 3.
Figure 5:
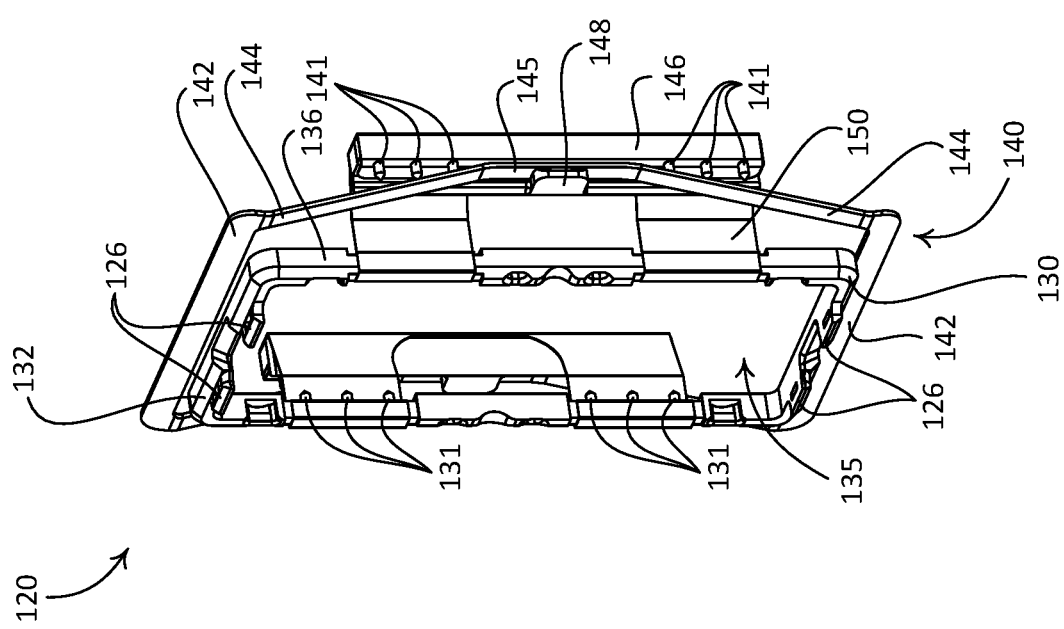
FIG. 5 is a front perspective view of the example base component illustrated in FIG. 3.
Figure 13:
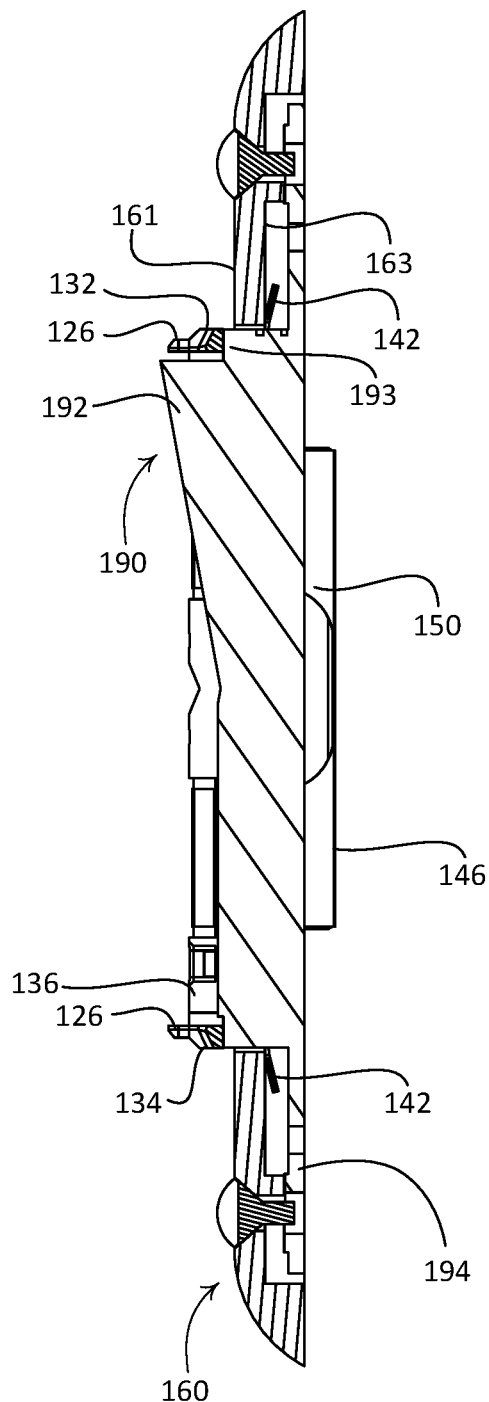
FIG. 13 is a cross section view of the example base component illustrated in FIG. 3 mounted to a paddle actuator of the light switch, the cross section taken through a midpoint of the faceplate.
Figure 14:
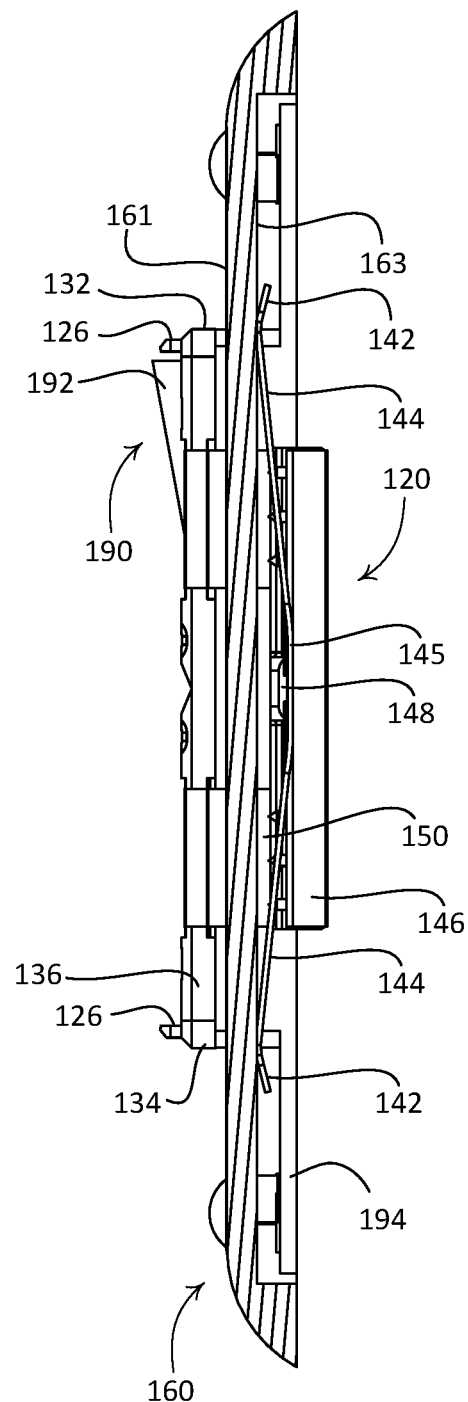
FIG. 14 is another cross section view of the example base component illustrated in FIG. 3 mounted to a paddle actuator of the light switch, the cross section taken through a midpoint of a spring support.
Figure 18:
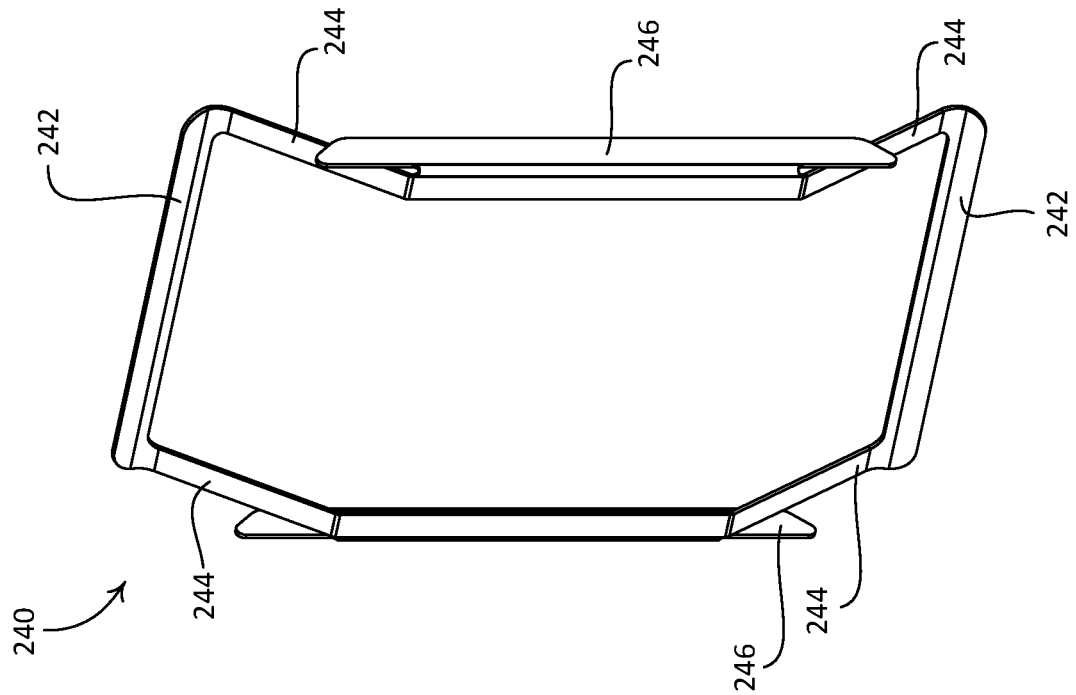
FIG. 18 is a rear perspective view of the biasing member of the example base component illustrated in FIG. 15.
Figure 17:
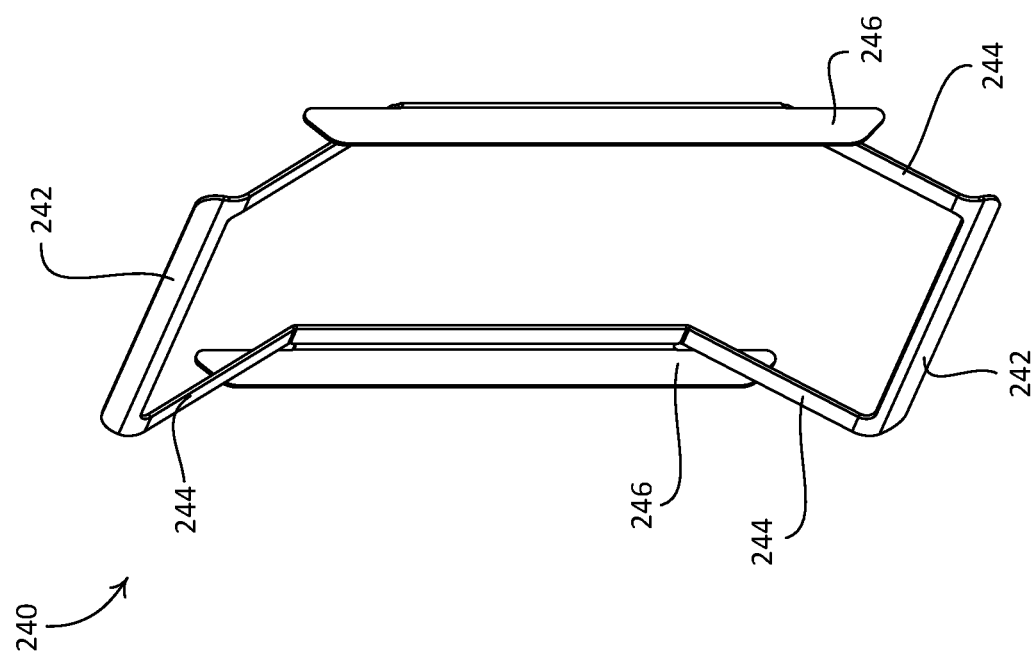
FIG. 17 is a front perspective view of a biasing member of the example base component illustrated in FIG. 15.

The mechanical switch 190 may include a paddle actuator 192 that may be actuated to turn on and/or turn off, the one or more electrical loads. The mechanical switch 190 may include a bezel 193 that surrounds the paddle actuator 192. An upper portion of the paddle actuator 192 may protrude from the bezel 193 (e.g., in a first orientation) when the electrical load is off, and a lower portion of the paddle actuator 192 may protrude from the bezel 193 (e.g., in a second orientation, as shown in FIG. 4) when the electrical load is on, or vice versa. The mechanical switch 190 may include a yoke 194 (FIG. 4) that enables mounting of the mechanical switch 190 to a structure. For example, the yoke 194 may be fastened to a single-gang wallbox that is installed in an opening of a structure (e.g., such as a wall, ceiling, etc.). As shown, a faceplate 160 may be secured to the mechanical switch 190, for instance to the yoke 194. The faceplate 160 may define a front surface 161 and an opposed rear surface 163. The front surface 161 may alternatively be referred to as an outer surface of the faceplate 160, and the rear surface 163 may alternatively be referred to as an inner surface of the faceplate 160. The faceplate 160 may define an opening 162 (e.g., a faceplate opening) therethrough that has an inner surface 167 and is configured to receive a portion of the mechanical switch 190. The faceplate 160 may be made of any suitable material, such as plastic. The remote control device 100 may be configured to be installed over the paddle actuator 192 of the mechanical switch 190 (e.g., mounted to the paddle actuator 192, the bezel 193, and/or the faceplate 160).

The load control system may further include a load control device (not shown) that is electrically connected to the one or more electrical loads (e.g., lighting loads). The load control device may include a load control circuit for controlling the intensity of one or more of the lighting loads between a low-end intensity (e.g., approximately 1%) and a high-end intensity (e.g., approximately 100%), and may include a wireless communication circuit. In an example implementation, the load control device may be a dimmer switch that is electrically connected to the one or more lighting loads. In another example implementation, each of the one or more electrical loads may be a controllable light source (e.g., a screw-in light-emitting diode (LED) lamp) that each may include a respective integrated load control circuit and wireless communication circuit (e.g., the lighting load includes a corresponding load control device that is configured for wireless communication). It should be appreciated that the load control system is not limited to the example load control devices described herein.

The remote control device 100 may include a control unit 110 (e.g., a control module) and a base 120 (e.g., a base component). The control unit 110 may be configured to be attached to the base 120. The control unit 110 may be mounted to the base 120. For example, the base 120 may be configured to mount the remote control device 100 over the mechanical switch 190. The base 120 may define clips 126 for removably securing the control unit 110 thereto. The clips 126 may be configured to engage complimentary features (e.g., tabs 114 shown in FIG. 2B) in the control unit 110. The base 120 may alternatively be referred to as a base portion, a mounting frame, or a mounting assembly. The control unit 110 and the base 120 may be configured such that the control unit 110 may be removably attached to the base 120. The base 120 may be configured to be attached to the faceplate 160. For example, the base 120 may be configured to be mounted within the faceplate opening 162. In this regard, the remote control device 100 may be mounted over an installed mechanical switch, such as the mechanical switch 190, without the need to perform any electrical re-wiring of the mechanical switch 190.

The control unit 110 may include a housing 111. The housing 111 may include a user interface comprising an actuation portion 112. The housing 111 may define sidewalls that extend from the actuation portion 112. The sidewalls may include an upper wall 121, a lower wall 122, and opposed side walls 123. The upper wall 121, the lower wall 122, and the opposed side walls 123 may extend from the actuation portion 112 towards the bezel 193 of the mechanical switch 190 (e.g., from a perimeter defined by the actuation portion 112). As an example, the actuation portion 112 may be removably attached to the housing 111. The control unit 110 may be configured to be removably secured to the base 120. For example, the control unit 110 (e.g., the housing 111) may comprise tabs 114 configured to engage complimentary features (e.g., the clips 126) in the base 120. The tabs 114 may be located along the upper wall 121 and/or the lower wall 122 of the housing 111.

Figure 1:
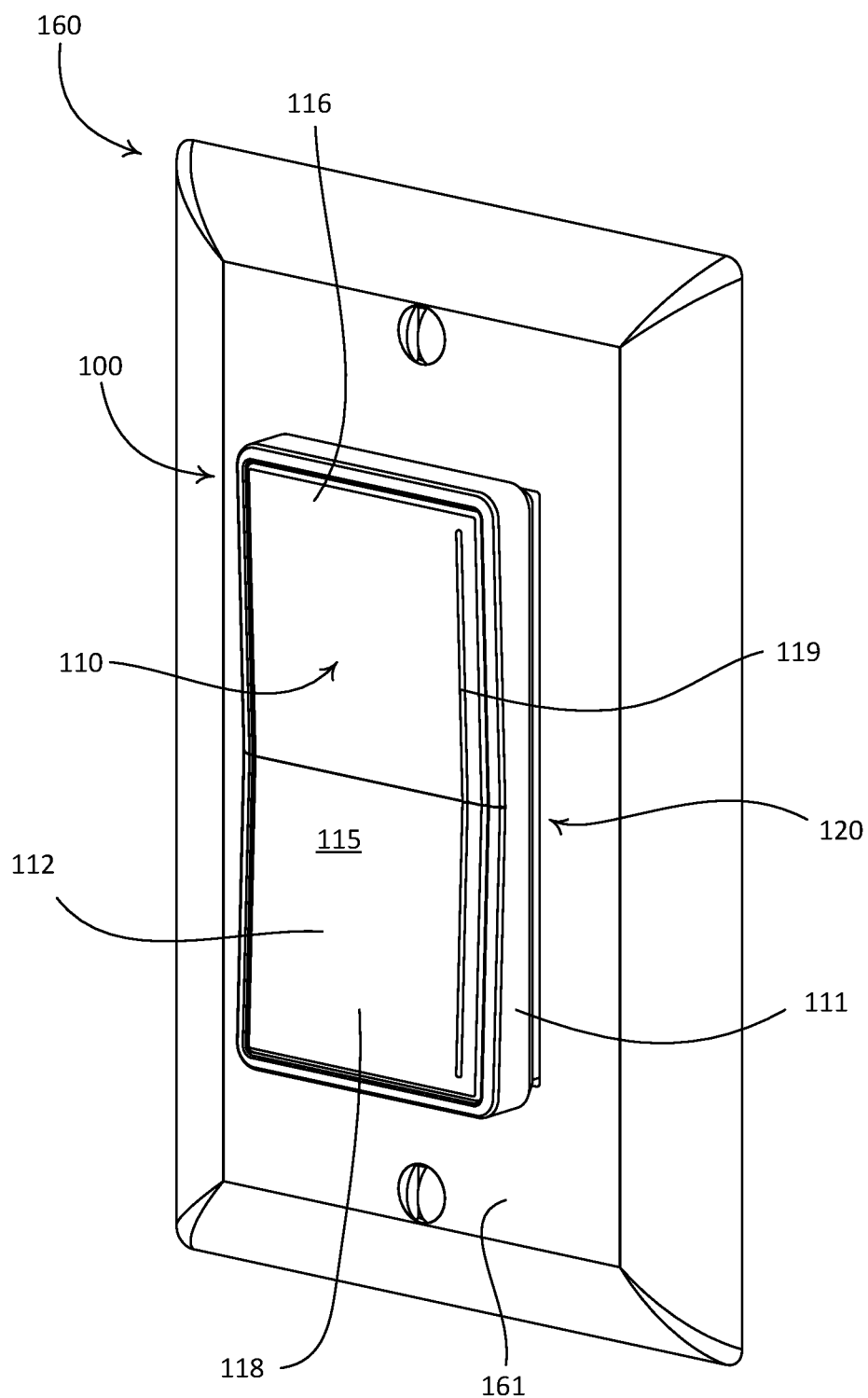
FIG. 1 is a perspective view of an example remote control device, with the remote control device mounted in an installed position over a light switch.
Figure 2A:
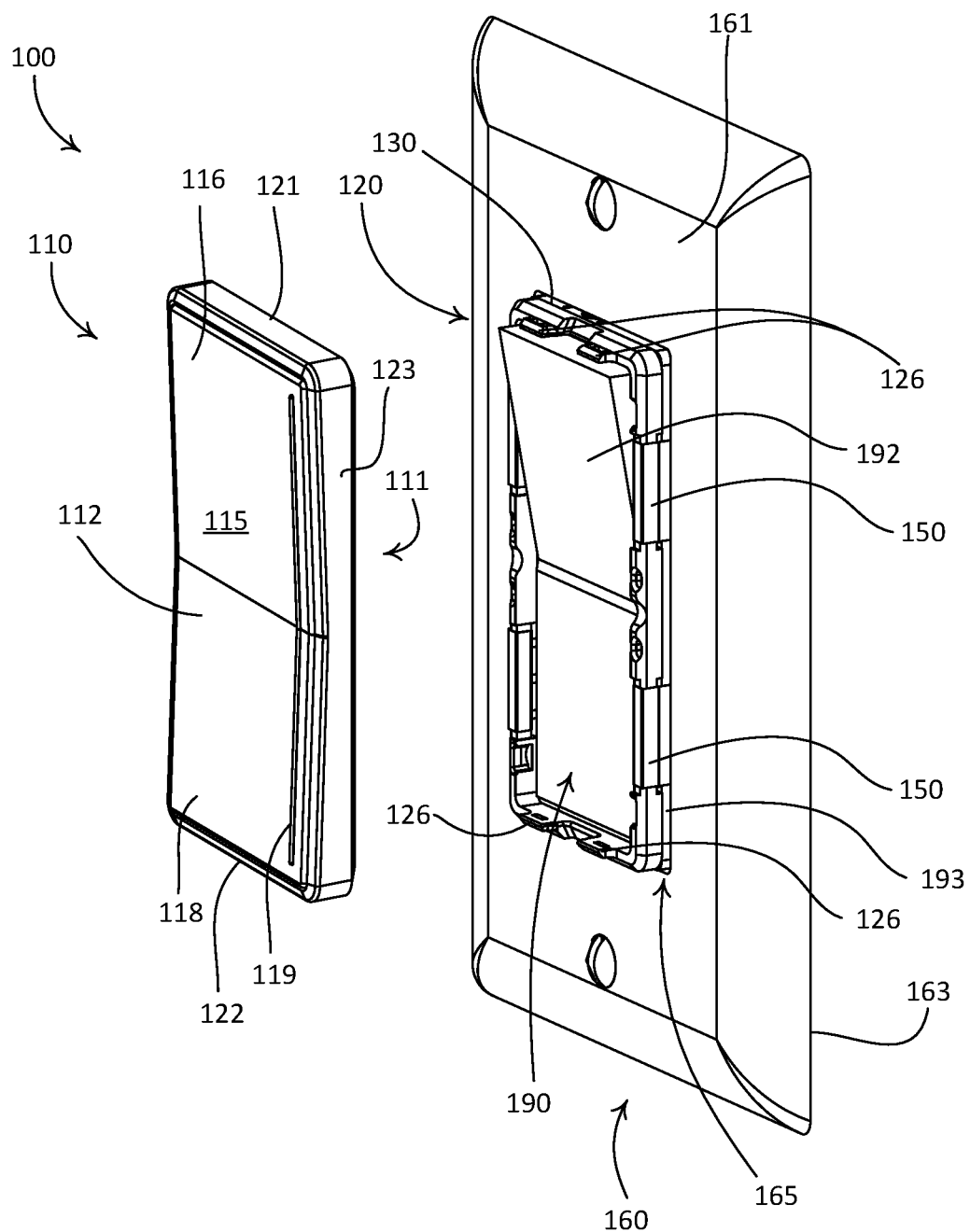
FIG. 2A is a partially exploded view of the example remote control device illustrated in FIG. 1.
Figure 2B:
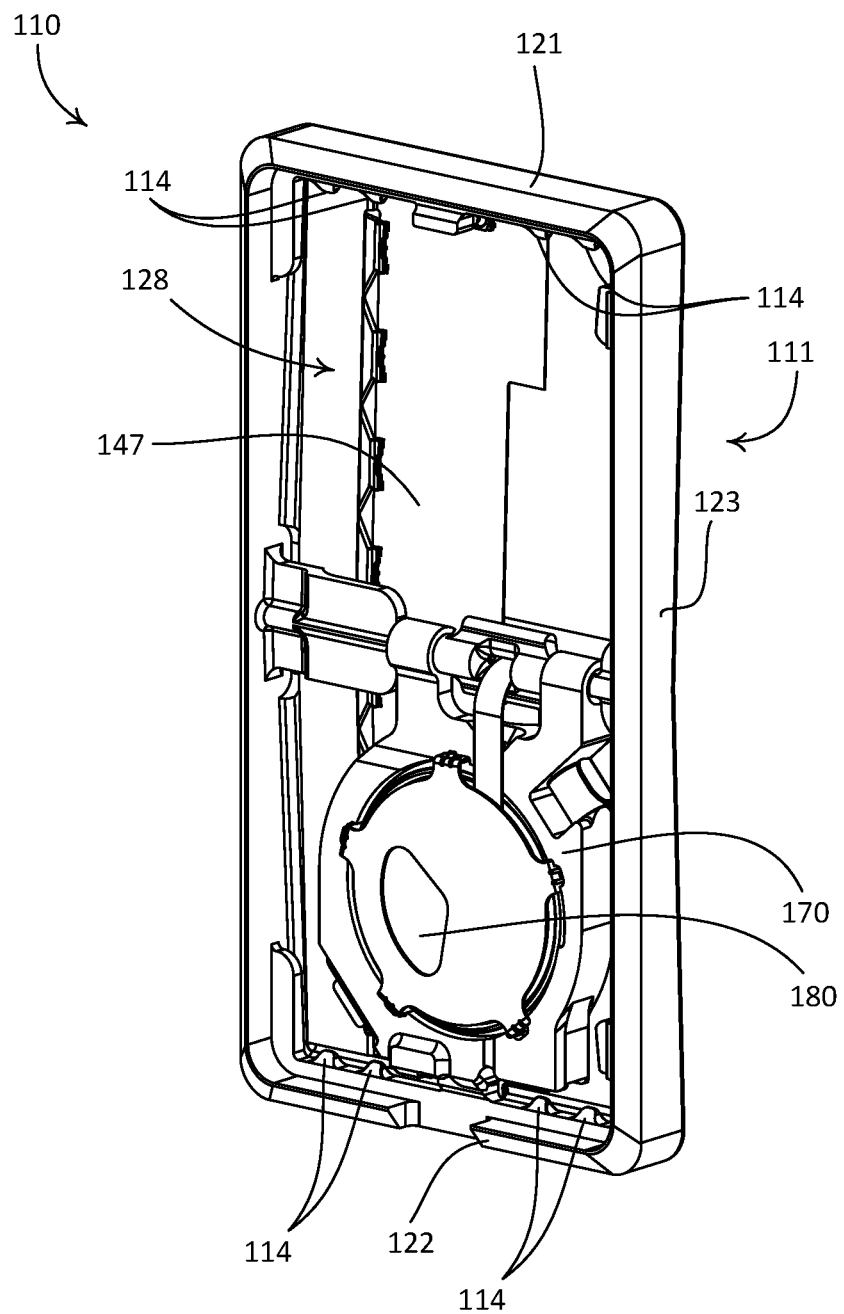
FIG. 2B is a rear perspective view of an example control unit of the example remote control device illustrated in FIG. 1.

As shown in FIGS. 1 and 2, the control unit 110 may be rectangular in shape and elongate between the upper wall 121 and the lower wall 122. It should be appreciated that the control unit 110 is not limited to the illustrated rectangular geometry, and that control unit may alternatively be configured with other suitable geometries. In accordance with the illustrated orientation of the control unit 110, the upper wall 121 may be referred to as an upper end of the control unit 110 and the lower wall 122 may be referred to as a lower end of the control unit 110. The upper and lower walls 121, 122 of the control unit 110 may also be referred to as first and second ends of the housing 111, respectively. The control unit 110 may include a printed circuit board 147 (e.g., a flexible or rigid printed circuit board). The control unit 110 (e.g., the housing 111) may define a void 128 (e.g., as shown in FIG. 2B). The void 128 may be configured to receive the printed circuit board 147 in an attached position. The void 128 may be defined by the upper wall 121, the lower wall 122, and the opposed side walls 123. The housing 111 may be made of any suitable material, such as plastic.

The actuation portion 112 may include a front surface 115 having an upper portion 116 and a lower portion 118. The actuation portion 112 may be configured to pivot about a central axis in response to an actuation of the upper portion 116 and the lower portion 118. The control unit 110 may be configured to control an electrical load. For example, the control unit 110 may be configured to turn the electrical load on in response to an actuation of the upper portion 116 and to turn the electrical load off in response to an actuation of the lower portion 118. The front surface 115 of the actuation portion 112 of the control unit 110 may define a user interface that is configured to receive inputs, such as gestures, from a user of the remote control device 100. The user interface may be configured as a touch sensitive surface (e.g., a capacitive touch surface) that is configured to receive (e.g., detect) inputs, such as gestures, from a user of the control unit 110. For example, the printed circuit board 147 may include one or more capacitive touch regions, or surfaces. The printed circuit board 147 may include one or more linear capacitive touch surfaces that face an inner surface of the actuation portion 112 when the printed circuit board 147 is disposed in the control unit 110. The front surface 115 of the actuation portion 112 may be configured to detect touches along an x-axis, a y-axis, or both an x-axis and a y-axis. The control unit 110 may also include a light bar 119 configured to be illuminated by one or more light sources (e.g., one or more LEDs). For example, the light bar 119 may be illuminated to visibly display information to a user of the control unit 110. The front surface 115 of the actuation portion 112 may be actuated along the light bar 119 to adjust the amount of power delivered to the lighting load according to the position of the actuation.

The control unit 110 may further include a control circuit (e.g., a processor, not shown) and a wireless communication circuit (e.g., a radio-frequency transceiver, not shown). The control unit 110 may be configured to translate one or more inputs (e.g., user inputs) from the user interface into respective control signals that may be used to control a load control device of a load control system. The one or more inputs may be applied via touches or presses of the upper portion 116 and/or lower portion 118 of the actuation portion 112. For example, the control circuit may be configured to receive input signals (e.g., that correspond to the user inputs) in response to actuations of the upper portion 116 and/or lower portion 118 by a user of the remote control device 100. For example, the input signals received by the control circuit may be the respective control signals translated from the control interface inputs. The control circuit may be configured to generate commands that the user desires the control unit 110 to execute in response to the input signals produced in response to actuations of the upper portion 116 and/or lower portion 118. The control unit 110 may be configured to cause the wireless communication circuit to transmit one or more control signals including the commands generated by the control circuit.

The control circuit may be configured to cause the wireless communication circuit to transmit respective commands that correspond to inputs and/or gestures received by the upper portion 116 and/or lower portion 118. For example, the remote control device 100 may be operable to transmit wireless signals, for example radio frequency (RF) signals, to a load control device, one or more electrical loads, and/or a central processor of a load control system. The remote control device 100 may be associated with the load control device and the one or more electrical loads during a configuration procedure of the load control system.

The control circuit may be configured to cause the wireless communication circuit to transmit respective commands that correspond to interpreted gestures received at the capacitive touch surface. For example, the remote control device 100 may be operable to transmit wireless signals, for example RF signals, to a load control device, one or more electrical loads, and/or a central processor of a load control system. The remote control device 100 may be associated with the load control device and the one or more electrical loads during a configuration procedure of the load control system. An example of a configuration procedure for associating a remote control device with a load control device is described in greater detail in commonly-assigned U.S. Patent Publication No. 2008/0111491, published May 15, 2008, entitled RADIO-FREQUENCY LIGHTING CONTROL SYSTEM, the entire disclosure of which is hereby incorporated by reference.

The light bar 119 of the control unit 110 may be configured to provide a visual indication of a command issued by the remote control device 100. For example, the control circuit may be configured to, upon receiving a gesture indicative of a command to change an amount of power delivered to an electrical load, such as a command to dim a lighting load, indicate the amount of power delivered to the electrical load by temporarily illuminating a number of the LEDs that corresponds with the desired amount of power (e.g., the desired dimming level of the lighting load). In such an example, the control circuit may be configured to cause the LEDs to be illuminated simultaneously, to illuminate sequentially with some or little overlap before fading, or to otherwise illuminate as desired. The control unit 110 may be configured to be attached to the base 120 with the light bar 119 located on a predetermined side of the control unit 110 (e.g., the right side of the control unit as shown in FIG. 1), for example, such that the light bar 119 may be illuminated to indicate the amount of power presently being delivered to the electrical load.

The illustrated control unit 110 may be battery-powered. For example, the control unit 110 may include a battery 180 (e.g., a coin cell battery as illustrated). The battery 180 may be placed in electrical communication with the circuitry mounted to the printed circuit board 147, for instance to power the capacitive touch regions, the control circuit, the wireless communication circuit, and/or other circuitry of the control unit 110. The control unit 110 may include a battery holder 170. The battery holder 170 may be configured to retain the battery 180 therein. The battery holder 170 may be configured to be installed within the void 128 of the control unit 110. The battery holder 170 may be configured to electrically connect the battery 180 to the electrical circuitry mounted to the printed circuit board 147).

The base 120 may be configured to locate the control unit 110 in front of the faceplate 160 (e.g., the front surface 161). For example, the base 120 may be configured to bias the control unit 110 towards the faceplate 160. The base 120 may be configured to accommodate mechanical switches having bezels and/or paddle actuators that extend various distances beyond the faceplate 160 (e.g., the front surface 161). As shown, the base 120 may include a frame 130, a biasing member 140, and a ribbon portion 150. The frame 130 may be configured to receive the control unit 110. The frame 130 may be configured to attach (e.g., removably attach) the control unit 110 to the base 120. The frame 130 may define a first end wall 132, an opposed second end wall 134, and opposed side walls 136 that extend from respective ends of the first end wall 132 to corresponding ends of the second end wall 134. In accordance with the illustrated orientation of the base 120, the first end wall 132 may be referred to as an upper end wall of the frame 130 and the second end wall 134 may be referred to as a lower end wall of the frame 130. The frame 130 may define a rear surface 138 that is configured to abut the bezel 193 of the mechanical switch 190.

As shown in FIG. 2A, the frame 130 may be configured to receive a protruding portion of the paddle actuator 192. For example, the frame 130 may define a frame opening 135 (FIG. 4) that is configured to receive the protruding portion of the paddle actuator 192. The frame opening 135 may be defined by the first end wall 132, the second end wall 134, and the opposed side walls 136.

The biasing member 140 may be configured to pull the frame 130 (e.g., the rear surface 138) against the bezel 193 of the mechanical switch 190. The biasing member 140 may be a coupling that is configured to engage a surface (e.g., the rear surface 163) of the faceplate 160. For example, the biasing member 140 may be configured to removably secure the base 120 to the faceplate 160. The biasing member 140 may be configured to apply a force on the rear surface 163 of the faceplate 160. For example, applying a force against the rear surface 163 of the faceplate 160 may bias the frame 130 against the bezel 193 of the mechanical switch. That is, the biasing member 140 may be configured such that the rear surface 138 of the frame 130 abuts the bezel 193 of the mechanical switch 190 when the remote control device 100 is mounted over the paddle actuator 192 of the mechanical switch 190. The biasing member 140 may include spring contacts 142, spring arms 144, and spring supports 146. The spring contacts 142 may extend between respective spring arms 144 at the top and the bottom of the biasing member 140. The spring contacts 142 may be configured to engage the rear surface 163 of the faceplate 160. For example, the spring contacts 142 may abut the rear surface 163 of the faceplate 160 above and below the faceplate opening 162. The spring contacts 142 may be configured to apply the force on the rear surface 163 of the faceplate 160. The spring contacts 142 may be configured to push the spring supports 146 into the wallbox. For example, when the spring contacts 142 abut the rear surface 163 of the faceplate 160, the biasing member 140 may push the spring supports 146 into the wallbox until the ribbon portion 150 is taut. When the ribbon portion 150 is taut, the spring supports 146 may float on either side of the mechanical switch 190 (e.g., within the wallbox). Since the spring contacts 142 extend between the spring arms 144 at the top and the bottom of the biasing member 140, the spring arms 144 and spring supports 146 may remain aligned as the base 120 is installed on the mechanical switch 190. In addition, the spring supports 146 may contact (e.g., hug) the sides of the bezel 193 of the mechanical switch 190, which may help to keep the base 120 aligned during installation and thus simplify the installation process of the remote control device 100.

The spring support 146 may be configured to float at the side of the mechanical switch 190. For example, the spring support 146 may extend into the wallbox to which the mechanical switch 190 is installed. The spring support 146 may extend as far into the wallbox as the ribbon portion 150 allow. For example, a length of the ribbon portion 150 may determine how far the spring supports 146 extend into the wallbox. The spring support 146 may be free from attachment. The spring support 146 may float within the wallbox (e.g., not attached to the mechanical switch 190, faceplate 160, and/or the wallbox) when the spring contacts 142 abut the rear surface 163 of the faceplate 160.

The spring supports 146 may extend into the wallbox on opposed sides of the mechanical switch 190, as shown. The spring arms 144 may extend from the spring supports 146 to the spring contacts 142. For example, the spring arms 144 may be configured to bias the spring contacts 142 away from the spring supports 146. The spring arms 144 may be compliant such that the spring contacts 142 are configured to be biased against the rear surface 163 of the faceplate 160. Each of the spring supports 146 may define a clip 148. The clip 148 may be configured to retain a respective spring arm 144. For example, the clips 148 may be configured to releasably secure the spring arms 144 to the spring supports 146. The biasing member 140 may define a flat portion 145. For example, each of the spring arms 144 may define the flat portion 145. The flat portions 145 may connect respective spring arms 144. The flat portions 145 may be configured to be received by respective clips 148. The flat portions 145 may be configured to abut the spring supports 146, for example, when received within the clips 148.

The ribbon portion 150 may be configured to attach the biasing member 140 to the frame 130. The ribbon portion 150 may be configured to be received by a gap 165 (FIG. 2) defined between the bezel 193 and the faceplate 160. For example, the ribbon portion 150 may extend through the gap 165 such that the frame 130 is located on a front side of the faceplate 160. The ribbon portion 150 may be a thin deformable material. For example, the ribbon portion 150 may be a polyester film, such as a mylar sheet. The ribbon portion 150 may be configured to bend such that the base 120 can extend through the gap 165 between the bezel 193 and the faceplate 160.

The ribbon portion 150 may be configured to connect the biasing member 140 to the frame 130. The ribbon portion 150 may be secured to the frame 130. For example, the ribbon portion 150 may be configured to wrap around a portion of the frame 130. The portion of the frame 130 which the ribbon portion 150 is wrapped around may have a reduced cross section. For example, an outer perimeter of the ribbon portion 150 wrapped around the portion of the frame 130 may be substantially the same as the other portions of the frame 130. The frame 130 may define one or more (e.g., a plurality of) stakes 131. The stakes 131 may be configured to secure the ribbon portion 150 (e.g., ends of the flexible material) to the frame 130. For example, the stakes 131 may be received by corresponding apertures (not shown) in the ribbon portion 150. It should be appreciated that although the ribbon portion 150 is shown wrapped around the frame 130 in the Figures, the ribbon portion 150 may be secured to the frame 130 by alternate means (e.g., such as using fasteners, welds, adhesives, etc.).

The ribbon portion 150 may be configured to connect the spring supports 146 to the frame 130. The ribbon portion 150 may be secured to the spring supports 146. For example, the ribbon portion 150 may be configured to wrap around a portion of the spring supports 146. The spring supports 146 may define one or more (e.g., a plurality of) stakes 141. The stakes 141 may be configured to secure the ribbon portion 150 (e.g., ends of the flexible material) to the biasing member 140. For example, the stakes 141 may be received by corresponding apertures (not shown) in the ribbon portion 150. It should be appreciated that although the ribbon portion 150 is shown wrapped around the spring supports 146 in the Figures, the ribbon portion 150 may be secured to the spring supports 146 by alternate means (e.g., such as using fasteners, welds, adhesives, etc.).

The ribbon portion 150 may include adhesive wings (not shown). The adhesive wings may be configured to adhere to sides of the bezel 193 of the mechanical switch 190. The adhesive wings may be configured to secure the ribbon portion 150 to the mechanical switch 190.

The base 120 may be configured to be installed onto the faceplate 160 before the faceplate 160 is secured to the mechanical switch 190. For example, the faceplate 160 may be removed from the mechanical switch 190 and the base 120 may be secured to the faceplate 160. The base 120 may be configured to be inserted into the faceplate opening 162. For example, the frame 130 may be inserted through the faceplate opening 162. When the frame 130 is inserted through the faceplate opening 162, the spring contacts 142 may abut the rear surface 163 of the faceplate 160. The base 120 and the faceplate 160 may then be mounted over the mechanical switch 190 such that the spring supports 146 extend into the wallbox.

FIGS. 15-18 depict another example base 220 for a remote control device (e.g., the remote control device 100 shown in FIGS. 1 and 2). The base 220 may be configured to locate a control unit (e.g., the control unit 110 shown in FIGS. 1 and 2) in front of a faceplate (e.g., the faceplate 160 shown in FIGS. 1-4, 13, and 14). For example, the base 220 may be configured to bias the control unit towards the faceplate. The base 220 may be configured to accommodate mechanical switches having bezels and/or paddle actuators that extend various distances beyond the faceplate (e.g., a front surface of the faceplate). As shown, the base 220 may include a frame 230 (e.g., such as the frame 130 shown in FIGS. 2-14), a biasing member 240, and a ribbon portion 250. The frame 230 may be configured to receive the control unit. The frame 230 may be configured to attach (e.g., removably attach) the control unit to the base 220. The frame 230 may define a first end wall 232, an opposed second end wall 234, and opposed side walls 236 that extend from respective ends of the first end wall 232 to corresponding ends of the second end wall 234. In accordance with the illustrated orientation of the base 220, the first end wall 232 may be referred to as an upper end wall of the frame 230 and the second end wall 234 may be referred to as a lower end wall of the frame 230. The frame 230 may define a rear surface 238 that is configured to abut a bezel of a mechanical switch (e.g., the bezel 193 of the mechanical switch 190 shown in FIGS. 2 and 4).

Figure 3:
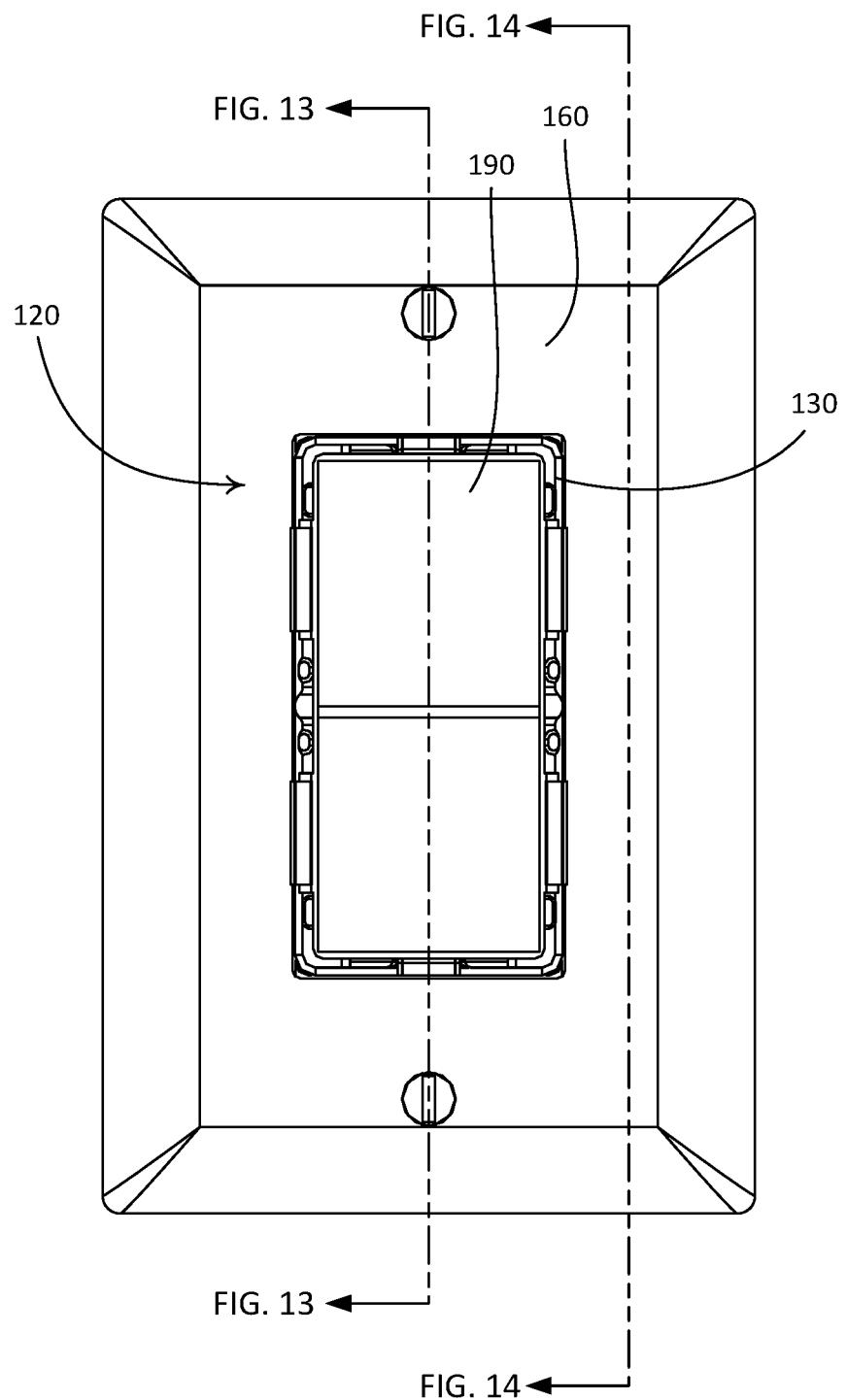
FIG. 3 is a front view of an example base component of the example remote control device illustrated in FIG. 1 mounted to the paddle actuator of the light switch.

The frame 230 may be configured to receive a protruding portion of a paddle actuator of the mechanical switch (e.g., the paddle actuator 192 shown in FIGS. 2-4). For example, the frame 230 may define a frame opening 235 that is configured to receive the protruding portion of the paddle actuator. The frame opening 235 may be defined by the first end wall 232, the second end wall 234, and the opposed side walls 236.

The biasing member 240 may be configured to pull the frame 230 (e.g., the rear surface 238) against the bezel of the mechanical switch. The biasing member 240 may be a coupling that is configured to couple the base 220 to the faceplate. For example, the biasing member 240 may be configured to engage a surface of the faceplate (e.g., the rear surface 163 of the faceplate 160). For example, the biasing member 240 may be configured to removably secure the base 220 to the faceplate 260. The biasing member 240 may be configured to apply a force on a rear surface of the faceplate (e.g., the rear surface 163 of the faceplate 160). For example, applying a force against the rear surface of the faceplate may bias the frame 230 (e.g., the rear surface 238) against the bezel of the mechanical switch.

The biasing member 240 may include spring contacts 242, spring arms 244, and elongated portions 246. The spring contacts 242 may extend between respective spring arms 244 at the top and the bottom of the biasing member 240. The spring contacts 242 may be configured to engage the rear surface of the faceplate. For example, the spring contacts 242 may abut the rear surface of the faceplate above and below an opening in the faceplate (e.g., the faceplate opening 162 shown in FIG. 4). The spring contacts 242 may be configured to apply the force on the rear surface of the faceplate. The elongated portions 246 may extend between the spring arms 244. The spring contacts 242 may be configured to push the elongated portions 246 into the wallbox. For example, when the spring contacts 242 abut the rear surface of the faceplate, the biasing member 240 may push the elongated portions 246 into the wallbox until the ribbon portion 250 is taut. When the ribbon portion 250 is taut, the elongated portions 246 may float on either side of the mechanical switch (e.g., within the wallbox). Since the spring contacts 242 extend between the spring arms 244 at the top and the bottom of the biasing member 240, the spring arms 244 and elongated portions 246 may remain aligned as the base 220 is installed on the mechanical switch. In addition, the elongated portions 246 may contact (e.g., hug) the sides of the bezel of the mechanical switch, which may help to keep the biasing member 240 aligned during installation and thus simplify the installation process of the remote control device.

The elongated portions 246 may be configured to float at the side of the mechanical switch. For example, the elongated portions 246 may extend into the wallbox to which the mechanical switch is installed. The elongated portions 246 may extend as far into the wallbox as the ribbon portion 250 allows. For example, a length of the ribbon portion 250 may determine how far the elongated portions 246 extend into the wallbox. The elongated portions 246 may be free from attachment. The elongated portions 246 may float within the wallbox (e.g., not attached to the mechanical switch, faceplate, and/or the wallbox) when the spring contacts 242 abut the rear surface of the faceplate.

The spring arms 244 may be configured to bias the spring contacts 242 away from the elongated portions 246. The spring arms 244 may be compliant such that the spring contacts 242 are configured to be biased against the rear surface of the faceplate. The elongated portions 246 may connect respective spring arms 244.

The ribbon portion 250 may be configured to attach the biasing member 240 to the frame 230. The ribbon portion 250 may be configured to be received by a gap defined between the bezel and the faceplate. For example, the ribbon portion 250 may extend through the gap such that the frame 230 is located on a front side of the faceplate. The ribbon portion 250 may be a thin deformable material. For example, the ribbon portion 250 may be a polyester film, such as a mylar sheet. The ribbon portion 250 may be configured to bend such that the base 220 can extend through the gap between the bezel and the faceplate.

The ribbon portion 250 may be configured to connect the biasing member 240 to the frame 230. The ribbon portion 250 may be secured to the frame 230. For example, the ribbon portion 250 may be configured to wrap around a portion of the frame 230. The portion of the frame 230 which the ribbon portion 250 is wrapped around may have a reduced cross section. For example, an outer perimeter of the ribbon portion 250 wrapped around the portion of the frame 230 may be substantially the same as the other portions of the frame 230. The frame 230 may define one or more (e.g., a plurality of) stakes 231. The stakes 231 may be configured to secure the ribbon portion 250 (e.g., ends of the flexible material) to the frame 230. For example, the stakes 231 may be received by corresponding apertures (not shown) in the ribbon portion 250. It should be appreciated that although the ribbon portion 250 is shown wrapped around the frame 230 in the Figures, the ribbon portion 250 may be secured to the frame 230 by alternate means (e.g., such as using fasteners, welds, adhesives, etc.). The ribbon portion 250 may be secured to the biasing member 240. For example, the ribbon portion 250 may be attached to the biasing member 240 using adhesive, crimps, clamps, and/or alternate means (e.g., such as using fasteners, welds, etc.).

The ribbon portion 250 may include adhesive wings (not shown). The adhesive wings may be configured to adhere to sides of the bezel of the mechanical switch. The adhesive wings may be configured to secure the ribbon portion 250 to the mechanical switch.

The base 220 may be configured to be installed onto the faceplate before the faceplate is secured to the mechanical switch. For example, the faceplate may be removed from the mechanical switch and the base 220 may be secured to the faceplate. The base 220 may be configured to be inserted into the faceplate opening. For example, the frame 230 may be inserted through the faceplate opening. When the frame 230 is inserted through the faceplate opening, the spring contacts 242 may abut the rear surface of the faceplate. The base 220 and the faceplate may then be mounted over the mechanical switch such that the elongated portions 246 extend into the wallbox.

Figure 19:
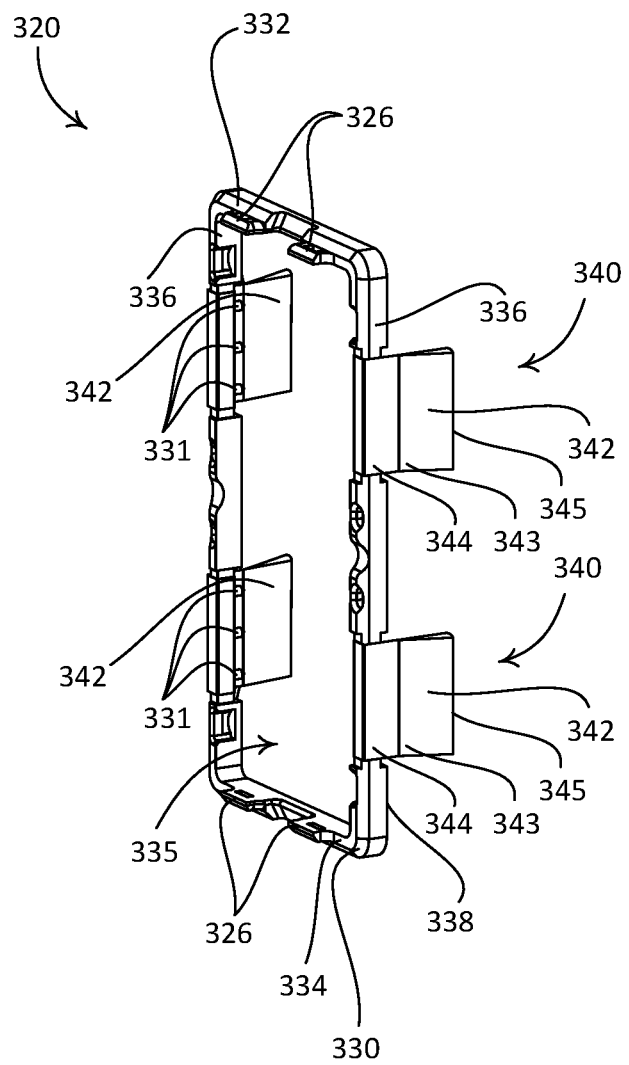
FIG. 19 is a front perspective view of another example base component of the example remote control device illustrated in FIG. 1.

FIG. 19 depicts another example base 320 for a remote control device (e.g., the remote control device 100 shown in FIGS. 1 and 2). The base 320 may be configured to locate a control unit (e.g., the control unit 110 shown in FIGS. 1 and 2) of the remote control device in front of a faceplate (e.g., the faceplate 160 shown in FIGS. 1-4, 13, and 14). For example, the base 320 may be configured to bias the control unit towards the faceplate. The base 320 may be configured to accommodate mechanical switches having bezels and/or paddle actuators that extend various distances beyond the faceplate (e.g., a front surface of the faceplate).

As shown, the base 320 may include a frame 330 (e.g., such as the frame 130 shown in FIGS. 2-14 or the frame 230 shown in FIGS. 15 and 16) and a coupling 340. The frame 330 may be configured to receive the control unit. The frame 330 may be configured to attach (e.g., removably attach) the control unit to the base 320. The frame 330 may define a first end wall 332, an opposed second end wall 334, and opposed side walls 336 that extend from respective ends of the first end wall 332 to corresponding ends of the second end wall 334. In accordance with the illustrated orientation of the base 320, the first end wall 332 may be referred to as an upper end wall of the frame 330 and the second end wall 334 may be referred to as a lower end wall of the frame 330. The frame 330 may define a rear surface 338 that is configured to abut a bezel of a mechanical switch (e.g., the bezel 193 of the mechanical switch 190 shown in FIGS. 2 and 4).

The frame 330 may be configured to receive a protruding portion of a paddle actuator of the mechanical switch (e.g., the paddle actuator 192 shown in FIGS. 2-4). For example, the frame 330 may define a frame opening 335 that is configured to receive the protruding portion of the paddle actuator. The frame opening 335 may be defined by the first end wall 332, the second end wall 334, and the opposed side walls 336.

The coupling 340 may be configured to pull the frame 330 (e.g., the rear surface 338) against the bezel of the mechanical switch. The coupling 340 may be a coupling that is configured to engage a surface of the faceplate (e.g., such as the rear surface 163 of the faceplate 160 shown in FIGS. 2A and 4). For example, the coupling 340 may be configured to removably secure the base 320 to the faceplate. The coupling 340 may be configured to apply a force on a surface of the faceplate. For example, the coupling 340 may be configured to apply a force on an inner surface of the faceplate (e.g., such as the inner surface 167 defined by the faceplate opening 162 shown in FIG. 4) and/or the rear surface (e.g., such as the rear surface 163 of the faceplate 160 shown in FIGS. 2A and 4). For example, applying a force against the surface of the faceplate may bias the frame 330 (e.g., the rear surface 338) against the bezel of the mechanical switch.

The coupling 340 may include one or more (e.g., a plurality of) flaps 342. Each of the flaps 342 may be wedge-shaped with a thickness that increases (e.g., gradually increases) in a direction distal from the rear surface 338 of the frame 330. The flaps 342 may be configured to be wedged in a gap (e.g., such as the gap 165 shown in FIG. 2) between the bezel and the faceplate. For example, the flaps 342 may each include a silicone-based material (e.g., silicone) that is configured to deform when wedged in the gap between the bezel and the faceplate. The flaps 342 may be thicker at an end distal from the frame 330. The gap may define a front portion that is proximate to the front surface of the faceplate and a rear portion that is proximate to the rear surface of the faceplate. An end portion 343 (e.g., that is proximate to the frame 330 and/or a ribbon portion 344 of the coupling 340) of each of the flaps 342 may be wedged into the rear portion of the gap such that the base 320 is removably secured to the faceplate. When the end portion 343 of each flap 342 is wedged into the rear portion of the gap, a distal portion 345 of the flap 342 may extend beyond the rear surface of the faceplate. When the end portions 343 of the flaps 342 are wedged into the rear portion of the gap, the flaps 342 may apply a force to the inner surface of the faceplate and/or the rear surface of the faceplate such that the base 320 is coupled to the faceplate. The flaps 342 may be configured to extend into the wallbox on opposed sides of the mechanical switch. For example, the distal portions 345 of the flaps 342 may float behind the rear surface of the faceplate on opposed sides of the mechanical switch. It should be appreciated that the flaps 342 are not limited to the geometry illustrated in FIG. 19. Alternatively, the flaps 342 may define another shape with a thickness that gradually increases from the end portion 343 to the distal portion 345. In another alternative, the flaps 342 may define a constant thickness (e.g., substantially constant thickness) from the end portion 343 to the distal portion 345.

The coupling 340 may be configured to attach to the frame 330. For example, the frame 330 may define one or more (e.g., a plurality of) stakes 331. The stakes 331 may be configured to secure the coupling 340 (e.g., ends of the flexible material) to the frame 330. For example, the stakes 331 may be received by corresponding apertures (not shown) in the coupling 340. It should be appreciated that although the coupling 340 is shown wrapped around the frame 330 in the Figures, the coupling 340 may be secured to the frame 330 by alternate means (e.g., such as using fasteners, welds, adhesives, etc.).

The coupling 340 may include a ribbon portion 344 (e.g., a plurality of ribbon portions 344, as shown in FIG. 19). The ribbon portion(s) 344 may be configured to attach the coupling 340 to the frame 330. For example, each of the plurality of flaps 342 may be attached to the frame 330 via respective ribbon portions 344. The ribbon portion(s) 344 may define the corresponding apertures that are configured to receive the stakes 331. For example, the ribbon portion(s) 344 may wrap around the frame 330. The ribbon portions 344 may attach to the flaps 342. For example, the ribbon portions 344 may wrap around the flaps 342. At least part of the ribbon portion(s) 344 may be received by the gap defined between the bezel and the faceplate. For example, the ribbon portions 344 may extend (e.g., at least partially) through the gap such that the frame 330 is located on a front side of the faceplate, the flaps 342 are wedged into (e.g., at least partially into) a rear portion of the gap, and the distal portions 345 of the flaps 342 are located on a rear side of the faceplate. The ribbon portion(s) 344 may be a thin deformable material. For example, the ribbon portion(s) 344 may be a polyester film, such as a mylar sheet. The ribbon portion(s) 344 may be configured to bend such that the base 320 can extend into the gap between the bezel and the faceplate.

The base 320 may be configured to be installed onto the faceplate before the faceplate is secured to the mechanical switch. For example, the faceplate may be removed from the mechanical switch and the base 320 may be secured to the faceplate. The base 320 may be configured to be inserted into the faceplate opening. For example, the frame 330 may be inserted through the faceplate opening. When the frame 330 is inserted through the faceplate opening, the flaps 342 may abut an inner surface of the faceplate opening and/or a rear surface of the faceplate (e.g., as the flaps 342 are deformed). The base 320 and the faceplate may then be mounted over the mechanical switch such that distal ends of the flaps 342 extend into the wallbox.

It should be appreciated that the base 120, 220, 320 is not limited to the respective configurations illustrated and described herein, and that respective components of the bases may alternatively be configured with other suitable geometries. For example, the base 120, 220, 320 may be alternatively configured such that the outer walls bound greater or lesser areas. To illustrate, the outer walls of the base 120, 220, 320 may be configured to bound an area that is smaller than the footprint of the paddle actuator 192 of the mechanical switch 190.

It should further be appreciated that the base 120, 220, 320 may be alternatively configured to allow releasable attachment of control units having geometries different from those of the illustrated control units. To illustrate, the base 120, 220, 320 may be alternatively configured to allow releasable attachment of control units having respective footprints (e.g., areas) that are larger than the corresponding footprint of the base 120, 220, 320, for instance such that the control units enclose the frame 130, 230, 330 and/or at least partially hide the frame 130, 230, 330 from view. Additionally, the base 120, 220, 320 may be alternatively configured to allow releasable attachment of control units other than the illustrated control unit 110 such as control units having different geometries and/or defining other types of user interfaces, for example.

It should further still be appreciated that configuring the base 120, 220, 320 of a remote control device such that the frame 130, 230, 330 of the base 120, 220, 320 biases against the bezel 193 of the mechanical switch 190 to which the base 120, 220, 320 is mounted may provide one or more advantages. For example, so configuring the base may limit or reduce the need to account for variables in one or more of the lateral (e.g., side-to-side), longitudinal (e.g., upward and downward), and transverse (e.g., along a direction perpendicular to the outer surface of the faceplate) that may be exhibited by the respective dimensions or geometries (e.g., paddle heights) of different mechanical switches and/or installation conditions of the mechanical switches. Additionally, so referencing the base to the bezel of the mechanical switch, for instance rather than to the outer surface of the faceplate, may eliminate the need to account for the frame enclosing the bezel of the mechanical switch, since bezel dimensions may vary from switch to switch.

It should further still be appreciated that the remote control device 100 illustrated and described herein may provide a simple retrofit solution for an existing switched control system and may ease the installation of a load control system or enhance an existing load control system installation. A load control system that integrates the remote control device 100 may provide energy savings and/or advanced control features, for example without requiring any electrical re-wiring and/or without requiring the replacement of any existing mechanical switches.

It should further still be appreciated that load control systems into which the example remote control device 100 may be integrated are not limited to the example load control devices and/or electrical loads described above. For example, load control systems into which the remote control device 100 may be integrated may include one or more of: a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of a heating, ventilation, and air-conditioning (HVAC) system; an air conditioner; a compressor; an electric baseboard heater controller; a controllable damper; a variable air volume controller; a fresh air intake controller; a ventilation controller; hydraulic valves for use in one or more radiators of a radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and the like.

What is claimed is:

1. A base configured to be mounted over a paddle actuator of an installed mechanical switch that controls whether power is delivered to an electrical load, the base comprising:
    a frame that defines a first end wall, a second end wall, and opposed side walls that extend between the first end wall and the second end wall, the frame defining an opening and a rear surface, wherein when the base is mounted over the paddle actuator, the opening receives a protruding portion of the paddle actuator therein and the rear surface abuts a bezel of the mechanical switch;
    a biasing member comprising:
        a pair of spring supports;
        a pair of spring contacts; and
        a plurality of spring arms, wherein each of the plurality of spring arms extends between a respective one of the pair of spring supports and a respective one of the pair of spring contacts to couple the respective one of the pair of spring supports to the respective one of the pair of spring contacts, each of the plurality of spring arms being compliant to bias the spring contacts against a rear surface of the faceplate; and
    a ribbon portion that attaches the biasing member to the frame,
    wherein when the base is mounted over the paddle actuator, the ribbon portion extends through a gap between the bezel and the faceplate such that the frame is located on a front side of the faceplate and the pair of spring supports extend into a wallbox to which the mechanical switch is installed.

2. The base of claim 1, wherein the ribbon portion is a thin flexible material that is configured to bend such that the base can extend through the gap between the bezel and the faceplate.

3. The base of claim 1, wherein the ribbon portion wraps around a portion of each of the opposed sidewalls to couple the biasing member to the frame.

4. The base of claim 3, wherein the frame defines a plurality of stakes that are configured to secure the ribbon portion to the frame.

5. The base of claim 4, wherein the ribbon portion defines a plurality of holes configured to receive the plurality of stakes.

6. The base of claim 1, wherein the biasing member is configured to bias the frame against the bezel.

7. The base of claim 1, wherein each of the pair of spring contacts is configured to apply, in a direction perpendicular to a structure in which the mechanical switch is installed, a force on the rear surface of the faceplate as the faceplate is attached to a yoke of the mechanical switch.

8. The base of claim 1, wherein each of the pair of spring supports defines a plurality of stakes that are configured to secure the ribbon portion to a respective one of the pair of spring supports.

9. The base of claim 1, wherein each of the pair of spring supports defines a clip configured to receive a respective spring arm.

10. The base of claim 9, wherein each of the plurality of spring arms defines a flat portion that is configured to be received by the clip of a respective one of the pair of spring supports, the flat portion configured to abut the respective one of the pair of spring supports.

11. The base of claim 1, wherein the frame defines attachment members configured to engage with complimentary features of the remote control device to secure the remote control device in an attached position relative to the mechanical switch.

12. The base of claim 1, wherein the ribbon portion is a first ribbon portion that extends from a first side of the frame, the base further comprising a second ribbon portion that extends from a second side of the frame.

13. A base configured to be mounted over a paddle actuator of an installed mechanical switch that controls whether power is delivered to an electrical load, the base comprising:
a frame that defines a first end wall, a second end wall, and opposed side walls that extend between the first end wall and the second end wall, the frame defining an opening and a rear surface, wherein when the base is mounted over the paddle actuator, the opening receives a protruding portion of the paddle actuator therein and the rear surface abuts a bezel of the mechanical switch;
a coupling configured to engage a surface of a faceplate of the mechanical switch such that the coupling is configured to removably secure the base to the faceplate; and
a ribbon portion that attaches the coupling to the frame, wherein when the base is mounted over the paddle actuator, the ribbon portion extends through a gap between the bezel and the faceplate such that the frame is located on a front side of the faceplate.

14. The base of claim 13, wherein the coupling comprises:
a pair of spring supports, wherein when the base is mounted over the paddle actuator, the pair of spring supports extend into a wallbox to which the mechanical switch is installed;
a pair of spring contacts; and
a plurality of spring arms, wherein each of the plurality of spring arms extends between a respective one of the pair of spring supports and a respective one of the pair of spring contacts to couple the respective one of the pair of spring supports to the respective one of the pair of spring contacts, each of the plurality of spring arms being compliant to bias the spring contacts against the surface of the faceplate.

15. The base of claim 14, wherein each of the pair of spring contacts is configured to apply, in a direction perpendicular to a structure in which the mechanical switch is installed, a force on the surface of the faceplate as the faceplate is attached to a yoke of the mechanical switch.

16. The base of claim 13, wherein the coupling comprises a flap that is wedge-shaped with a thickness that increases toward a distal portion that is distal from the frame.

17. The base of claim 16, wherein the flap is configured to be wedged in the gap between the bezel and the faceplate.

18. The base of claim 17, wherein the flap is silicone and is configured to deform when wedged in the gap between the bezel and the faceplate.

19. The base of claim 13, wherein the coupling comprises a plurality of flaps that extend from the rear surface of the frame.

20. The base of claim 13, wherein the coupling comprises a biasing member that is configured to apply a force on the rear surface of the faceplate.

21. The base of claim 13, wherein the ribbon portion is a thin flexible material that is configured to bend such that the base can extend through the gap between the bezel and the faceplate.

22. The base of claim 21, wherein the ribbon portion is configured to wrap around a portion of the frame to connect the coupling to the frame.

23. The base of claim 22, wherein the frame defines a plurality of stakes that are configured to secure the ribbon portion to the frame.

24. The base of claim 23, wherein the ribbon portion defines a plurality of holes configured to receive the plurality of stakes.

25. The base of claim 13, wherein the ribbon portion is a first ribbon portion that extends from a first side of the frame, the base further comprising a second ribbon portion that extends from a second side of the frame.

* * * * *